United States Patent [19]

Herman

[11] Patent Number: 4,775,864

[45] Date of Patent: Oct. 4, 1988

[54] LOCAL AREA NETWORK WITH MULTIPLE NODE BUS TOPOLOGY

[75] Inventor: Morton B. Herman, Huntington, N.Y.

[73] Assignee: Standard Microsystems Corporation, Hauppauge, N.Y.

[21] Appl. No.: 894,035

[22] Filed: Aug. 7, 1986

[51] Int. Cl.[4] .................... H04Q 9/00; H04B 1/40; H04J 3/00; H04L 5/14

[52] U.S. Cl. ................ 340/825.500; 370/32; 375/7; 375/36

[58] Field of Search ............ 340/825.000, 825.01, 340/825.05, 825.17; 375/36, 7; 370/85, 124, 32; 307/241

[56] References Cited

U.S. PATENT DOCUMENTS

| | | | |
|---|---|---|---|
| 3,237,164 | 2/1966 | Evans | 340/825.17 |
| 3,935,480 | 1/1976 | Stuckert | 307/241 |
| 4,481,641 | 11/1984 | Gable et al. | 375/36 |
| 4,597,076 | 6/1986 | Bingham et al. | 370/85 |
| 4,620,310 | 10/1986 | Lvosky et al. | 375/36 |
| 4,627,052 | 12/1986 | Hoare et al. | 370/85 |
| 4,646,319 | 2/1987 | Engel et al. | 375/36 |
| 4,649,548 | 3/1987 | Crane | 375/36 |

FOREIGN PATENT DOCUMENTS

| | | | |
|---|---|---|---|
| 2452207 | 11/1980 | France | 375/36 |
| 0169458 | 12/1981 | Japan | 375/36 |

Primary Examiner—Donald J. Yusko
Attorney, Agent, or Firm—Hopgood, Calimafde, Kalil, Blaustein & Judlowe

[57] ABSTRACT

In a local area network, a plurality of nodes are connected to a single port of a hub through a length of cable and a corresponding plurality of transceivers attached to the cable, each of the transceivers having an output impedance significantly greater than the cable characteristic impedance, thereby allowing a plurality of nodes to be connected to one hub port with a single cable.

8 Claims, 4 Drawing Sheets

LOCAL AREA NETWORK WITH MULTIPLE NODE BUS TOPOLOGY

The present invention relates generally to data communication, and more particularly to an improved local area network.

Local area networks, which permit digital data communications between personal computers, printers, work stations and similar data stations, are becoming increasingly popular in offices, factories and similar locations to allow digital data communication, typically over coaxial cable or twisted pairs of transmission lines, between different computers and associated peripheral stations at spaced locations within the office or factory facility. Local area networks thus, for example, permit users of personal computers to share applications, programs, printers, plotters, and files, while independently employing the memories and computing power of the individual computers.

Various types of local area networks are presently in use including the CSMA/CD/CA and token-passing networks, which employ different techniques to control the transmission of digital data through the transmission lines between the computers to prevent two or more different streams of data from colliding, thereby to resolve the intended destinations of the data in the network.

One known local area token-passing network includes a plurality of multi-port transceiver-repeaters or hubs. In this system each node or computer station in the local area network is connected directly to one port of an active hub through a transceiver to a dedicated coaxial cable in a so-called modified tree structure. Each of the transceivers in the network is designed to have an output impedance substantially equal to the characteristic impedance of the cable, in accordance with conventional transmission line theory which holds that signal reflection is avoided by terminating a cable with its characteristic impedance. However, if two of such transceivers are connected to one port of a hub, the cable would no longer be properly terminated in its characteristic impedance and signal transmission would then be deleteriously affected. The designer of the conventional local area network is thus required to supply one hub port for each node in the network, and a dedicated cable must be run from each node to a hub port. These requirements significantly increase both the cost and complexity of the local area network because of the relatively large amount of cables required and the number of active hub ports required for each node in the network.

It is accordingly an object of the present invention to provide a local area network of the type described which is less costly and complex than the presently known networks.

It is a further object of the present invention to provide a local area network of the type described in which a plurality of nodes can be connected to a single hub port with a single cable.

To these ends, in the local area network of the present invention, in contrast to the conventional local area network in which each node is connected to an associated single port by means of a dedicated cable through a transceiver having a relatively low output impedance equal to the cable's characteristic impedance, a plurality of nodes are respectively connected to a single port and to a single cable, which has been properly terminated at both its ends, by means of transceivers each having an output impedance considerably, to wit, at least ten times, higher than the characteristic impedance of the cable without significantly distorting the signal on the cable.

To the accomplishment of the above and such further objects as may hereinafter appear, the present invention relates to a local area network substantially as defined in the appended claims and as described in the following specification as considered with the accompanying drawing in which:

Figure 1:
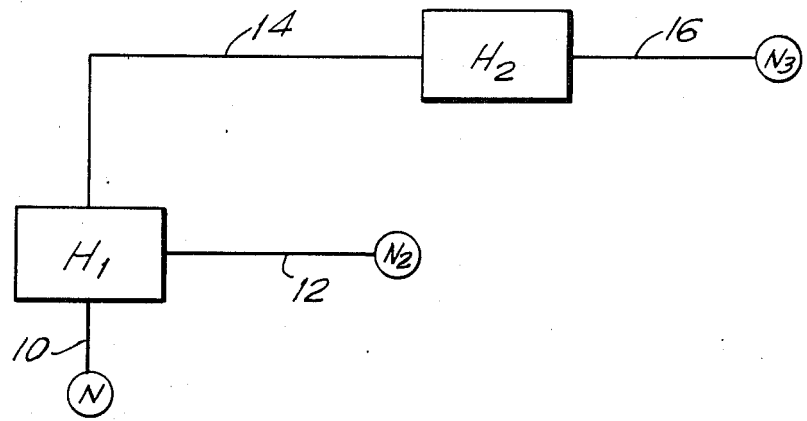
FIG. 1 is a block diagram of a conventional local area network.

The representative conventional local area network illustrated in FIG. 1 includes a plurality, here two, of multi-port active hubs $H_1$ and $H_2$. Selective ports of each hub are connected typically by means of a length of coaxial cable such as RG62 coax cable having a characteristic impedance of 93 ohms, either to a node N or to the port of another hub. Thus, as shown in FIG. 1, one port in hub $H_1$ is connected by a length 10 of cable to a node $N_1$, a second port of hub $H_1$ is connected by a second length 12 of cable to a second node $N_2$, and a third port of hub $H_1$ is connected by a length 14 of cable to a port of another hub $H_1$. A second port of hub $H_2$ is connected by a length 16 of coax cable to a node $N_3$.

Each node in the conventional local area network illustrated in FIG. 1, may, as is conventional, include a transceiver coupled to the coax cable and a communication adapter or local area network controller connected to the transceiver and a host computer. The local area controller handles the lower-level protocol of sending and receiving data on the coaxial cable. The COM 9026 manufactured and sold by Standard Microsystems Corp. is an example of a local area network controller that can be used for this purpose.

In the conventional local area network, as illustrated in FIG. 1, the coaxial cable is terminated at the hub port to which it is connected at its characteristic impedance, and the output impedance of the transceiver is set to be substantially equal to the characteristic impedance of the cable, which for the RG62 coax cable is 93 ohms. In this manner, according to conventional transmission line theory, the coaxial cable would be terminated at each of its ends with its characteristic impedance, thereby to eliminate undesired signal reflection on the cable. This, however, has the disadvantage of allowing only one node and transceiver to be connected to any individual hub port.

In the local area network of the invention a plurality, typically eight, of different nodes can be readily connected to a single hub port by departing from conventional theory through the connection of the nodes through transceivers having a relatively high output impedance and terminating the cable at both of its ends with its characteristic impedance. Thus, as in the embodiment of the invention shown in FIG. 2, one port of a single multi-port active hub H3 is connected to a length 18 of coaxial cable, which is terminated at its end remote from the hub at a passive impedance 20, which is substantially equal to the cable's characteristic impedance. The cable 18 is also terminated at the hub port at its characteristic impedance. Rather than having only a single node connected to the hub port, as in the conventional network of FIG. 1, in the local area network of the invention, as illustrated in FIG. 2, a plurality of, here eight, nodes $N_1$–$N_8$ are connected to cable 18 and thus to the port of hub H3 without significantly distorting the signal on the cable.

The increase in the number of nodes that can be reliably connected to a single port of an active hub in a local area network is made possible in the network of the present invention by setting the output impedance of the transceiver at each of the nodes at a relatively high level as compared to the cable characteristic impedance. As an example, but not intended to limit the scope of the invention, for a coaxial cable having a characteristic impedance of 93 ohms, the output impedance of each of the node transceivers, $N_1$–$N_8$, as in the embodiment of the invention shown in FIG. 2, may be in the order of 5,000 ohms, advantageously at least ten times the cable characteristic impedance or 930 ohms, but more desirably at least 2,000 ohms. Similarly, the transmission line to which the high-impedance transceivers are connected may be in the form of a twisted pair which typically has a characteristic impedance in the order of 150 ohms.

Figure 2:
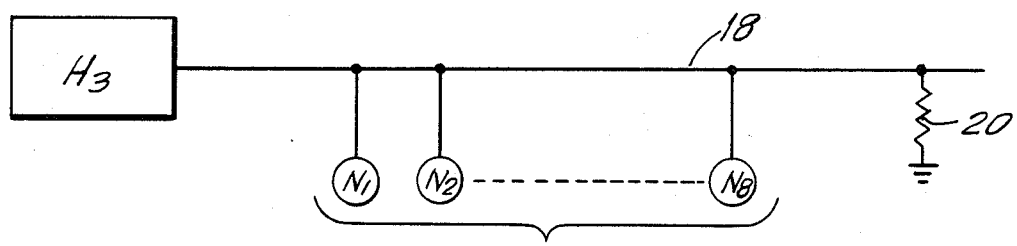
FIG. 2 is a block diagram of a local area network configured in accordance with the present invention.
Figure 3:
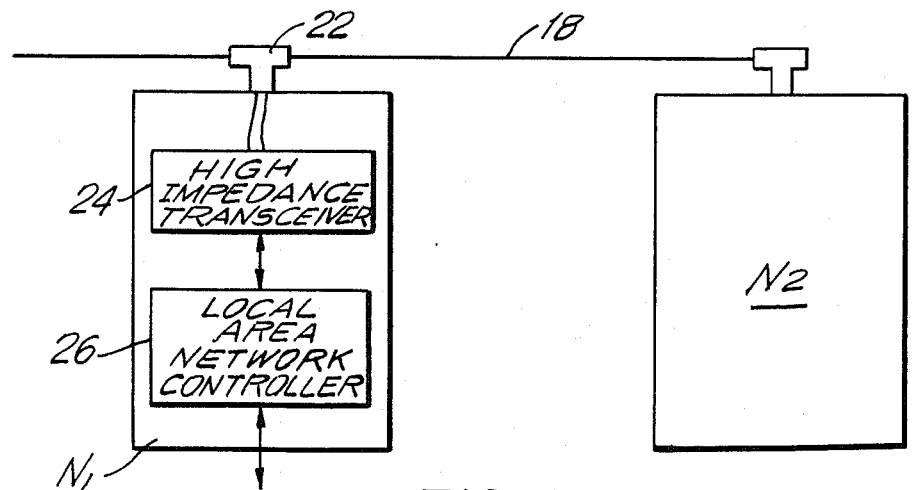
FIG. 3 is a more detailed diagram of a portion of the network of FIG. 2.

FIG. 3 illustrates in somewhat greater detail than FIG. 2 the manner in which a node, such as node $N_1$, is connected to cable 18 in the network configuration of FIG. 2. As shown in FIG. 3, the cable 18 is provided with a series of T-connectors 22, and the input of the high-impedance transceiver 24 is connected to both the shield and center of the coax cable 18 through conductors. The output of the transceiver 24 is also connected, as is per se conventional, to a network controller 26, which is connected, as is also per se conventional, to a communication station, such as a host computer (not shown).

Figure 4:
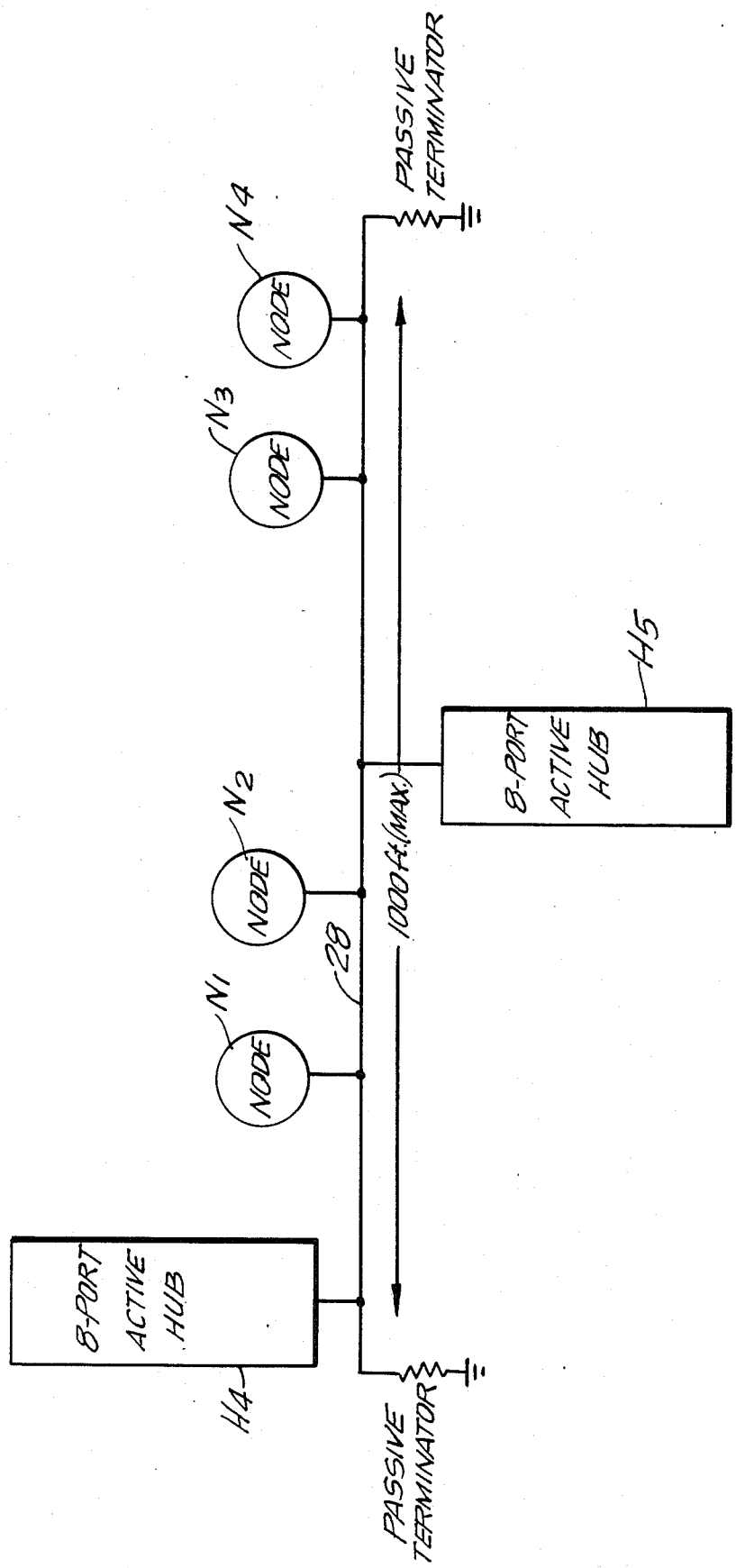
FIG. 4 is a block diagram of an alternate configuration of a local area network according to the present invention.

The basic configuration of the local area network of the invention of FIG. 2 can be varied to provide different network configurations. One such variation is shown in FIG. 4, in which hub ports from two 8-port active hubs H4 and H5 are connected to a length of cable 28 (properly terminated at each end with passive 93 ohm terminators) along with several nodes $N_1$, $N_2$, $N_3$ and $N_4$, each of which includes a high-impedance transceiver of the type described above with respect to FIGS. 2 and 3. To permit this connection of the hubs in this manner, the hubs differ from the conventional hubs shown in FIGS. 1 and 2, for example, in that each includes a high-impedance transceiver of the type described herein.

Figure 5:
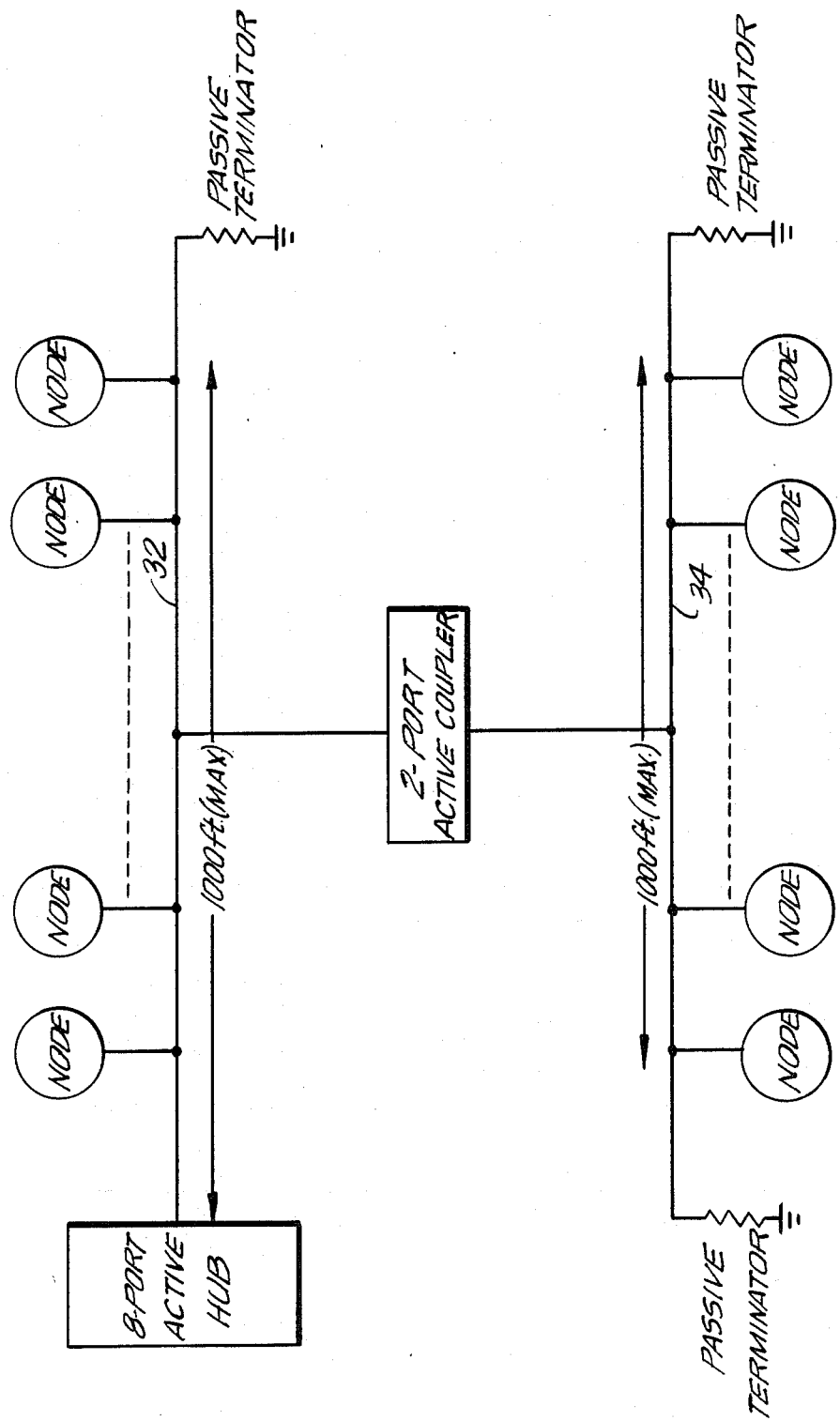
FIG. 5 is a diagram of another alternate configuration of a local area network according to the invention.

In the alternative network configuration illustrated in FIG. 5, a two-port active coupler 30 made with transceivers is connected to two coax cables 32, 34, each of which is terminated at its characteristic impedance as shown, and a plurality of nodes including the high-impedance transceiver, as described above, are connected to the cables. Such an arrangement would allow the user to maintain a network consisting of 30 nodes or more without the need for an expensive eight-port active hub. This configuration would also be useful in larger local area networks. In such an environment, one active hub port might be attached to several nodes and to one port of a two port coupler. The other port of the coupler might be connected to a cable which contained several other nodes. In this way, one hub port could service an even greater number of nodes.

Figure 6:
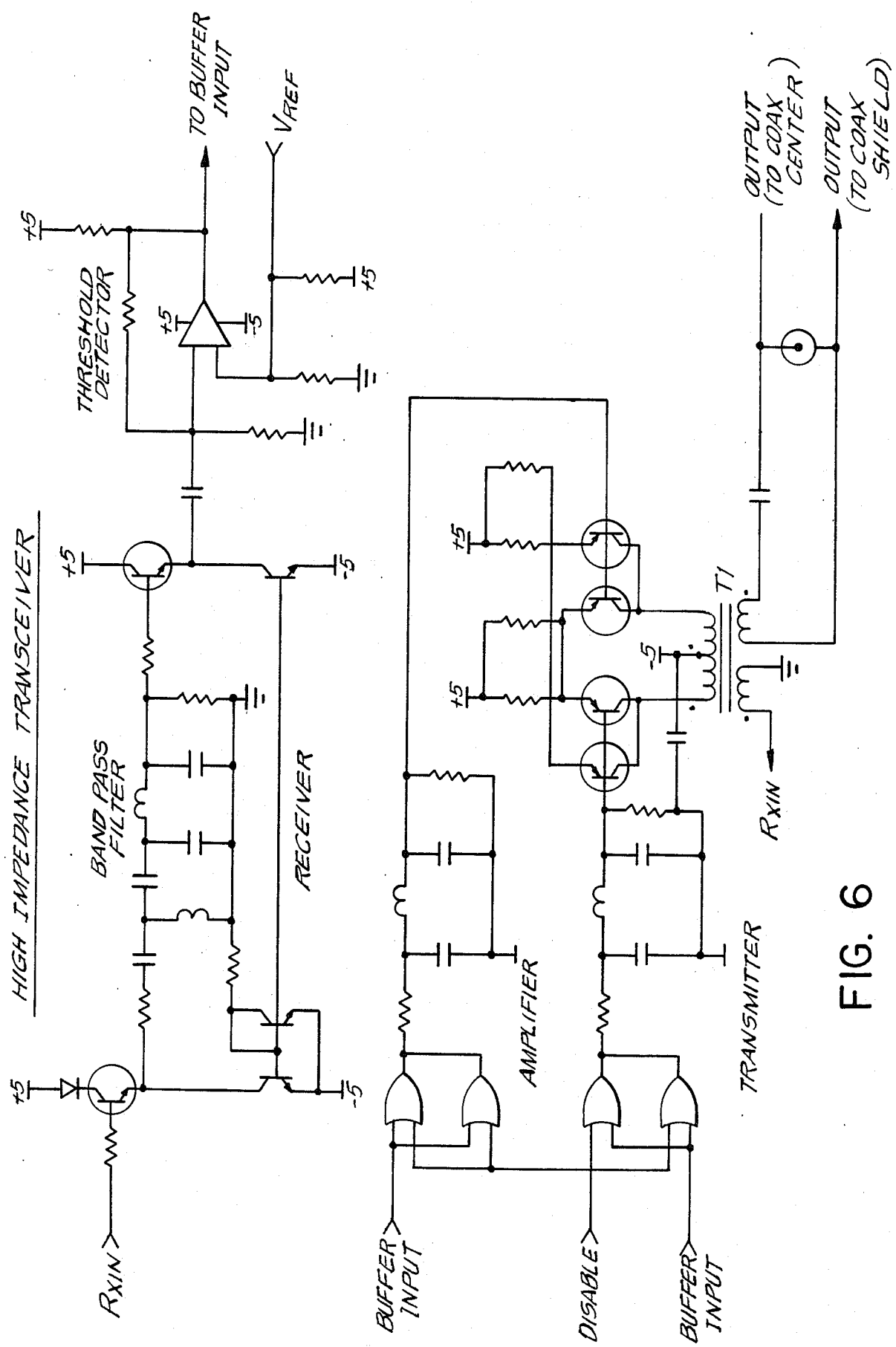
FIG. 6 is a schematic diagram of a high-impedance transceiver for use in the local area network of the present invention.

One form of a high-impedance transceiver for use in the local area network of the invention is shown in FIG. 6. As therein shown, the transceiver includes a receiver consisting of a band-pass filter receiving data $R_{XIN}$ from the transmitter output at its input, and a threshold detector which compares the filtered signal against a reference signal $V_{RER}$ and produces an output signal, which is applied to each half of the transmitter input as buffer input. Each stage of the transmitter is connected to one side of a primary winding. As seen in FIG. 6, in the transmitter portion of the transceiver, the ends of the primary winding of transformer T1 are connected to the coupled emitters of two pairs of transistors, each transistor pair constituting one stage of the transmitter. The collectors of these transistors are coupled through resistors to a +5 volt supply, whereas their emitters are coupled via a tap on the primary winding of transformer T1 to a −5 volt supply. The bases of the two pairs of transistors respectively receive the filtered buffer input signals. As a result of the biasing of these transistors connected to the primary winding of transformer TI, as shown in FIG. 6, these transistors are never saturated, and they operate in their linear regions, and thus, are maintained at a relatively high impedance, which is reflected across the winding of transformer T1, thereby to establish the desired high impedance for the transceiver during transmission as well as during receiving. The secondary winding of transformer TI isolation transformer $T_1$ which has a 2:1 winding ratio between its primary winding and secondary winding. The latter is connected to the receiver portion of the circuit and to the center and shield of the coaxial cable. The receiver observes the activity on the cable through this transformer (at ½ amplitude because of the winding ratio), and, as noted, compares the data signals $R_{XIN}$ to the signal voltage reference. Any pulse greater than this reference is treated as valid data, which allows the receiver to filter out noise on the cable.

It will be appreciated from the foregoing description of presently preferred embodiments of the invention that a local area network has been described which permits increased flexibility and convenience of design and use at a reduced cost. It will also be appreciated that modifications to these embodiments, such as in the specific circuit design of the high-impedance transceiver, may be made without necessarily departing from the spirit and scope of the invention.

What is claimed is:

1. For use in a local area network including an active hub having at least one port, a transmission line terminating at at least one of its ends at its characteristic impedance, a transceiver operatively connected to said transmission line, said transceiver having an output impedance at least ten times as high as the characteristic impedance of said transmission line, thereby permitting a plurality of such transceivers to be connected via said transmission line to said one port without significantly distorting the signal on said transmission line, said transceiver comprising a transmitter having an output and a receiver receiving data from said transmitter output at its input, said transmitter including active circuit means connected to the input, means biasing said active circuit means for establishing a high impedance thereat during both transmission and reception, a transformer having a primary winding connected to said high impedance circuit means, and first and second windings inductively coupled to said primary winding and connected respectively to said receiver and to said transmission line.

2. In the local area network of claim 1, in which the input impedance of said transceiver is greater than 1,000 ohms.

3. In the local area network of claim 1 or 2, in which a plurality of said transceivers are connected in common to said transmission line.

4. In the local area network of claim 1 or 2, in which said transmission line is one of a coaxial cable and a twisted pair having a characteristic impedance in the order of 93 ohms and 150 ohms, respectively.

5. In the local area network of claim 1, in which said active circuit means comprises first and second transistors respectively coupled to each side of said primary winding, said bias means comprising means coupled to said transistors for maintaining said transistors in a substantially conductive and non-saturated state, thereby to establish a relatively high impedance at said primary winding.

6. In the local area network of claim 1, in which said receiver further includes a threshold detector to compare the level of the signal received from the output of said transmitter against a reference signal.

7. In the local area network of claim 6, in which said transformer has a 2:1 winding ratio between its said primary winding and its secondary windings.

8. In the local area network of claim 6, in which said transmission line is a coaxial cable having a center conductor and shield cable, said second secondary winding being connected to the center conductor and shield of said cable.

* * * * *